April 16, 1946.  R. F. HERTEL  2,398,638
DYNAMOELECTRIC MACHINE
Filed Dec. 6, 1944  2 Sheets-Sheet 1

Inventor:
Roland F. Hertel,
by Harry E. Dunham
His Attorney.

Inventor:
Roland F. Hertel,
by Harry E. Dunham
His Attorney.

Patented Apr. 16, 1946

2,398,638

UNITED STATES PATENT OFFICE 2,398,638

DYNAMOELECTRIC MACHINE

Roland F. Hertel, Fort Wayne, Ind., assignor to General Electric Company, a corporation of New York Application December 6, 1944, Serial No. 566,833

26 Claims. (Cl. 188—104)

My invention relates to dynamoelectric machines and in particular to a machine of the eddy current inductor type with an improved cooling arrangement in which the cooling liquid is supplied directly to the air gap between the two relatively rotatable members of the machine.

An object of my invention is to provide an improved dynamoelectric machine of the eddy current inductor type.

Another object of my invention is to provide an improved dynamoelectric machine with an arrangement for cooling the machine which includes supplying cooling fluid to the air gap between the two relatively rotatable members.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 1:
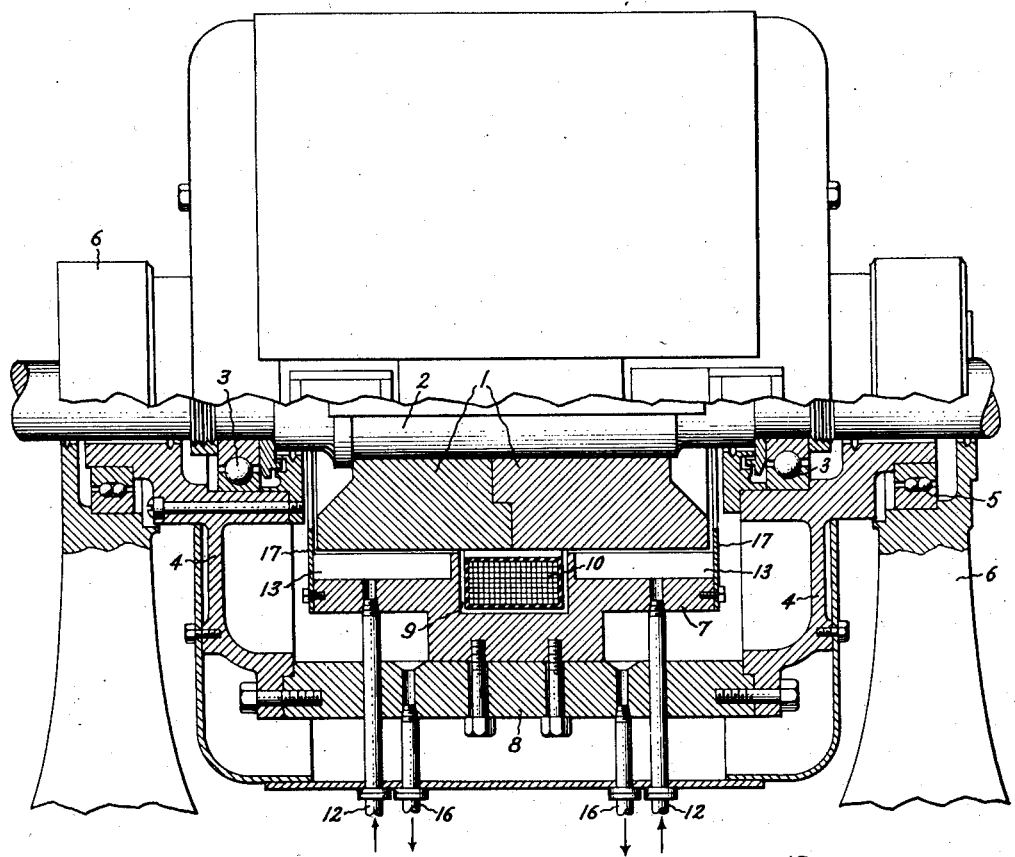
Figure 2:
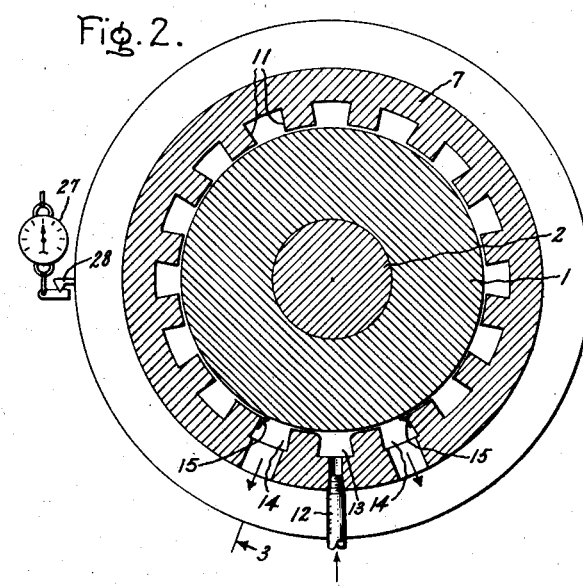
Figure 3:
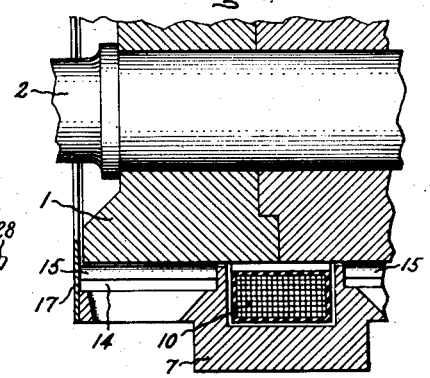
Figure 4:
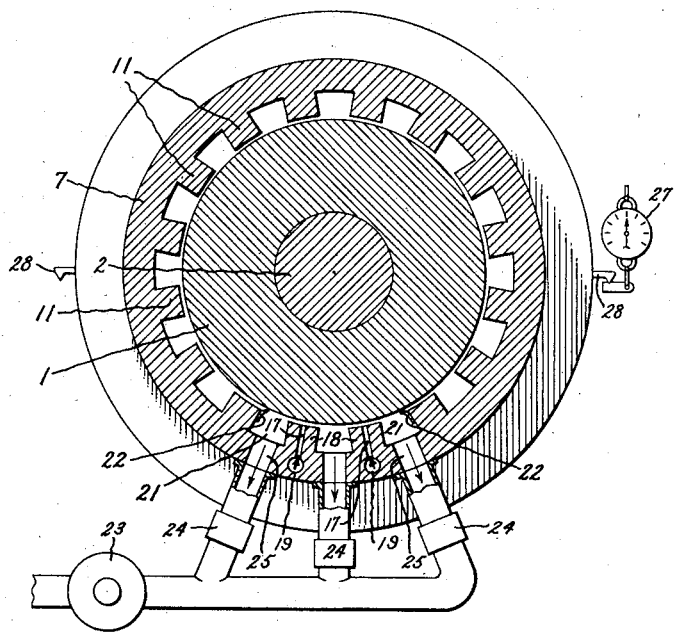
Figure 5:
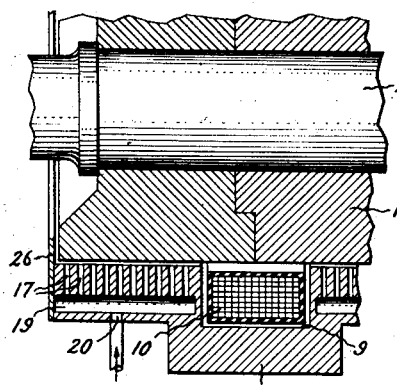

In the drawings, Fig. 1 is a side elevational view of a dynamometer, partly in section, showing an embodiment of my invention; Fig. 2 is a sectional end view through the rotatable member and the magnetic portion of the stationary member shown in Fig. 1; Fig. 3 is a longitudinal sectional view through a part of the dynamoelectric machine shown in Fig. 1 illustrating the exhaust opening through the stationary member of the machine; Fig. 4 is a sectional end view through a machine of the type shown in Fig. 1 illustrating another embodiment of my improved invention; Fig. 5 is a longitudinal sectional view through a part of the machine shown in Fig. 4 illustrating the cooling fluid supply construction; and Fig. 6 is a partial longitudinal sectional view of the machine shown in Fig. 4 showing the exhaust openings in this machine.

Referring to the drawings, I have shown in Figs. 1, 2, and 3 an embodiment of my invention in connection with a dynamoelectric machine of the eddy current inductor type which is adapted to be used as an absorption dynamometer. In this construction, the dynamoelectric machine is provided with a rotatable member 1 formed of magnetic material having a relatively smooth outer surface, and which is adapted to form part of a magnetic circuit for the machine. This member is mounted on a shaft 2 which is rotatably supported by bearings 3 in a bearing housing formed in an end shield 4 of another relatively rotatable member, and this end shield 4 is rotatably supported by antifriction ball bearings 5 mounted in pedestals 6. The other relatively rotatable member in this construction is formed as a stationary member having limited rotational movement to provide for measuring the torque transmitted to the machine, and is provided with a core 7 of magnetic material which is mounted in an outer frame 8 secured to the end shield 4. The stationary core member 7 is formed with a recess 9 in the central part thereof in which a field exciting winding 10 is arranged for magnetically exciting the machine through the rotatable member part 1 and the stationary member core 7. Electric currents are adapted to be induced in the relatively smooth surface portion of the rotatable member by teeth 11 in the core 7 which form a toothed portion on each side of the field exciting winding 10 of the stationary member core 7 and which are arranged adjacent the relatively smooth surface of the rotatable member 1 with an air gap therebetween for cooperating electromagnetically in the operation of the machine. During operation of the machine, the eddy currents which are generated in the relatively smooth surface portion of the rotatable member tend to raise the temperature of this member to such an extent that it is necessary to provide for cooling the machine. In my improved construction, cooling fluid, such as water, is supplied directly into the air gap of the machine and is adapted to be exhausted from the machine after contact with only a fractional circumferential part of the rotatable member so as to minimize hydraulic drag on the rotatable member. In this embodiment of my invention, cooling fluid is supplied through supply pipes 12 into slots 13 between teeth in the stationary member core 7. Rotation of the rotatable member 1 in either direction causes the cooling fluid which flows substantially radially out of the slots 13 into the air gap to contact the adjacent surface of the rotatable member 1 and to be exhausted substantially radially into slots 14 spaced circumferentially on each side of the supply slots 13. Scoop elements 15 are arranged on the teeth on the sides of the slots away from the cooling fluid supply slot 13 to assist in removing the cooling fluid from the air gap. If desired, a scavenging pump may also be used to provide for more positively exhausting the cooling fluid from the drain slots 14 similar to the arrangement shown in Fig. 6. The cooling fluid is exhausted from the machine through a drain passage in the bottom of the slot 14 into the lower portion of the frame 8 of the stationary member, from which it is drained through suitable exhaust pipes 16. In some instances the cooling water may be drained by exhaust pipes connected directly to the slots between the teeth. In certain instances, it might be found desirable to provide exhaust or drain openings through the lower portion of more than one of the slots on each side of the supply opening in order to assure removal of the cooling fluid. Since the entire surface of the rotatable member 1 passes over the cooling fluid supply slots 13 during a complete revolution, the entire surface of the rotatable member will be cooled by contact with this cooling fluid, and since the cooling fluid discharges from the air gap after contact with only a relatively small part of the surface of the rotatable member, the hydraulic drag is reduced very materially over that which would be present if the cooling fluid were to be in contact with the entire periphery of the rotatable member during its operation. In this embodiment of my invention, baffles 17 are secured over the outer ends of the stationary member to minimize the axial flow of the cooling fluid through the air gap and to minimize the flow of the cooling fluid toward the bearings of the machine.

Figure 6:
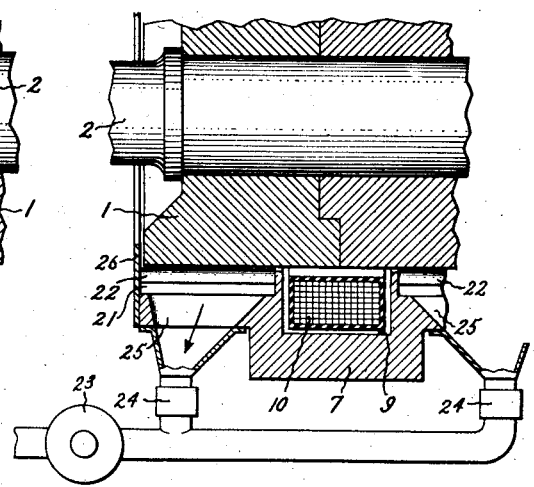

Referring to Figs. 4, 5, and 6 of the drawings, I have shown another embodiment of my invention in a machine similar to that shown in Figs. 1, 2, and 3, in which the rotatable member 1 is mounted on a shaft 2 and adapted to be supported in the same manner as in the previously described construction. This rotatable member also is adapted to cooperate electromagnetically with a stationary member having a frame similar to that in the previously described arrangement and provided with the same mounting and field excitation arrangement including a field exciting winding 10 in a circumferentially extending recess 9 formed in the stationary core member 7. In this construction, however, the cooling fluid is supplied to the air gap between the teeth 11 of the stationary core member 7 and the rotatable member 1 through a plurality of spray jet openings 17 which extend through a pair of teeth 18 in the lower portion of the stationary member and which communicate with a header opening 19 formed in the base of these two teeth 18 and adapted to communicate with a supply pipe opening 20 for supplying cooling liquid, such as water, to the header opening 19. In this arrangement, the cooling fluid is supplied radially into the air gap, and rotation of the rotatable member 1 in either direction will tend to wet the surface of the rotatable member for only a fractional circumferential part thereof for any given position and to exhaust the cooling liquid substantially radially into the two slots 21 spaced circumferentially on the sides of the two teeth 18 in the direction of rotation from these two teeth. Scoop elements 22 are arranged on the sides of the teeth away from the cooling fluid supply teeth 18, and a scavenging pump 23 may also be connected by flexible connections 24 to the exhaust slot 25 to assure the positive removal of the cooling fluid from the air gap. This cooling fluid is drained from the slots 21 through exhaust openings 25 in the same manner as that shown in the construction of Figs. 1, 2, and 3, and is then similarly exhausted from the machine through suitable drain pipes. As in the other construction, the number of radial fluid supply openings on each side of the field exciting winding 10 may be varied from one to any number which may be considered desirable in order to cool the machine adequately and yet maintain the hydraulic drag on the rotatable member to a minimum practical value. Similarly, the number of exhaust openings 25 through slots 21 may also be varied in order to assure the correct drainage from the machine and to obtain the desired amount of contact of the cooling fluid with a fractional circumferential part of the rotatable member 1.

In both of the illustrated constructions, the location of the exhaust openings in the slots of the machine preferably are arranged in the lower portion of the stationary member in order to facilitate drainage of the cooling fluid, and these exhaust openings also can be varied from the position shown in the slots adjacent the supply means to slots removed two or more slots from the supply means, so as to provide for varying the amount of contact with the surface of the rotatable member. In any case, it is desirable to minimize the passage of the cooling fluid to the bearings of the machine, and, therefore, baffle plates 26 are secured over the outer ends of the slots 21 in the embodiment shown in Figs. 4, 5, and 6. The torque on the stationary members may be measured in any suitable manner as by a conventional scale 27 to which it is transmitted by a suitable arm 28.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having a member with a relatively smooth cylindrical surface, means including a second member having a toothed portion adjacent said smooth surface with an air gap therebetween for inducing electric currents in said first-mentioned member, means for supplying cooling fluid into said air gap into contact with said smooth surface, and means including a suction device for exhausting the cooling fluid from the air gap between teeth of said toothed portion and spaced circumferentially from said supply means providing for contact of the cooling fluid with only a fractional circumferential part of said smooth surface for any given position thereof.

2. A dynamoelectric machine having a rotatable member with a relatively smooth outer surface, means including a second member having a toothed portion with slots between the teeth adjacent said rotor smooth surface with an air gap therebetween for inducing electric currents in said rotatable member, means in said second member for supplying cooling fluid into said air gap into contact with said rotatable member, and means for exhausting the cooling fluid from the air gap through at least one slot spaced circumferentially from said supply means in said second member providing for contact of the cooling fluid with only a fractional circumferential part of said rotatable member for any given position thereof.

3. A dynamoelectric machine having a member with a relatively smooth cylindrical surface, means including a second member having a toothed portion adjacent said smooth surface with an air gap therebetween for inducing electric currents in said first-mentioned member, means for supplying cooling fluid into said air gap into contact with said smooth surface, and means including a suction device for exhausting the cooling fluid from the air gap between teeth of said toothed portion and spaced circumferentially from said supply means providing for contact of the cooling fluid with only a fractional circumferential part of said smooth surface for any given position thereof.

4. A dynamoelectric machine having a rotatable member with a relatively smooth outer surface, means including a second member having a toothed portion with slots between the teeth adjacent said rotor smooth surface with an air gap therebetween for inducing electric currents in said rotatable member, means for supplying cooling fluid into said air gap into contact with said rotatable member, and means for radially exhausting the cooling fluid from the air gap through at least one slot spaced circumferentially from said supply means in said second member providing for contact of the cooling fluid with only a fractional circumferential part of said rotatable member for any given position thereof.

5. A dynamoelectric machine having a rotatable member with a relatively smooth outer surface, means including a second member having a toothed portion with slots between the teeth adjacent said rotor smooth surface with an air gap therebetween for inducing electric currents in said rotatable member, means for supplying cooling fluid substantially radially into said air gap into contact with said rotatable member, and means for radially exhausting the cooling fluid from the air gap through at least one slot spaced circumferentially from said supply means in said second member providing for contact of the cooling fluid with only a fractional circumferential part of said rotatable member for any given position thereof.

6. A dynamoelectric machine having a rotatable member forming part of a magnetic circuit and having a relatively smooth outer surface, means including a second member of magnetic material having a toothed portion with slots between the teeth adjacent said rotor smooth surface with an air gap therebetween for inducing electric currents in said rotatable member, means for supplying cooling fluid into said air gap into contact with said rotatable member, and means for radially exhausting the cooling fluid from the air gap through a plurality of slots spaced circumferentially from said supply means in said second member providing for contact of the cooling fluid with only a fractional circumferential part of said rotatable member for any given position thereof.

7. A dynamoelectric machine of the inductor type having a rotatable member with a relatively smooth outer surface adapted to form part of a magnetic circuit, means including a second member having a toothed portion adjacent said rotor smooth surface with an air gap therebetween and arranged to cooperate electromagnetically with said rotatable member for forming a part of said magnetic circuit therewith and for inducing electric currents in said rotatable member, means for supplying cooling fluid into said air gap into contact with said rotatable member, and means spaced circumferentially from said cooling fluid supply means for exhausting the cooling fluid from the air gap between teeth of said toothed portion and through means providing for contact of the cooling fluid with only a fractional circumferential part of said rotatable member for any given position thereof.

8. A dynamoelectric machine having a rotatable member with a relatively smooth outer surface, means including a second member having a toothed portion adjacent said rotor smooth surface with an air gap therebetween and arranged to cooperate electromagnetically with said rotatable member for inducing electric currents in said rotatable member, means for supplying cooling fluid into said air gap through radial supply means into contact with said rotatable member, and means spaced circumferentially from said cooling fluid supply means for exhausting the cooling fluid from the air gap through radial exhaust means providing for contact of the cooling fluid with only a fractional circumferential part of said rotatable member for any given position thereof.

9. A dynamoelectric machine of the inductor type having a rotatable member with a relatively smooth outer surface adapted to form part of a magnetic circuit, means including a second member having a toothed portion adjacent said rotor smooth surface with an air gap therebetween and arranged to cooperate electromagnetically with said rotatable member for forming a part of said magnetic circuit therewith and for inducing electric currents in said rotatable member, means for supplying cooling fluid into said air gap into contact with said rotatable member, and means spaced circumferentially from said cooling fluid supply means for exhausting the cooling fluid from the air gap through radial exhaust means between teeth of said toothed portion providing for contact of the cooling fluid with only a fractional circumferential part of said rotatable member for any given position thereof.

10. A dynamoelectric machine having a rotatable member with a relatively smooth outer surface portion of magnetic material, means including a second member of magnetic material having a toothed portion with slots between adjacent teeth and arranged adjacent said rotor smooth surface with an air gap therebetween for inducing electric currents in said rotatable member, means for supplying cooling fluid into said air gap into contact with said rotatable member, and means spaced circumferentially from said cooling fluid supply means for exhausting the cooling fluid from the air gap between teeth of said toothed portion and through at least one of said slots in said second member providing for contact of the cooling fluid with only a fractional circumferential part of said rotatable member for any given position thereof.

11. A dynamoelectric machine having a rotatable member forming part of a magnetic circuit and having a relatively smooth outer surface, means including a second member of magnetic material having a toothed portion with slots between the teeth adjacent said rotor smooth surface with an air gap therebetween for inducing electric currents in said rotatable member, means for supplying cooling fluid substantially radially into said air gap into contact with said rotatable member, and means for substantially radially exhausting the cooling fluid from the air gap through a plurality of slots spaced circumferentially from said supply means in said second member providing for contact of the cooling fluid with only a fractional circumferential part of said rotatable member for any given position thereof.

12. A dynamoelectric machine having a rotatable member forming part of a magnetic circuit and having a relatively smooth outer surface, means including a second member of magnetic material having a toothed portion with slots between adjacent teeth and arranged adjacent said rotor smooth surface with an air gap therebetween for inducing electric currents in said rotatable member, means for supplying cooling fluid substantially radially into said air gap through at least one of said slots in said second member into contact with said rotatable member, and means for exhausting the cooling fluid from the air gap through at least one other of said slots in said second member spaced circumferentially from said cooling fluid supply means providing for contact of the cooling fluid with only a fractional circumferential part of said rotatable member for any given position thereof.

13. A dynamoelectric machine having a rotatable member forming part of a magnetic circuit and having a relatively smooth outer surface, means including a second member of magnetic material having a toothed portion with slots between adjacent teeth and arranged adjacent said rotor smooth surface with an air gap therebetween for inducing electric currents in said rotatable member, means for supplying cooling fluid substantially radially into said air gap through at least one of said teeth in said second member into contact with said rotatable member, and means for exhausting the cooling fluid from the air gap including at least one of said slots spaced circumferentially on each side of said supply tooth in said second member providing for contact of the cooling fluid with only a fractional circumferential part of said rotatable member for any given position thereof.

14. A dynamoelectric machine of the eddy current inductor type having a rotatable member with a relatively smooth outer surface adapted to form part of a magnetic circuit, means including a stationary member having a toothed portion adjacent said rotor smooth surface with an air gap therebetween and arranged to cooperate electromagnetically with said rotatable member for forming a part of said magnetic circuit and for inducing electric currents in said rotatable member, means for supplying cooling fluid into said air gap through at least one of said slots in said stationary member into contact with said rotatable member, and means spaced circumferentially from said cooling fluid supply means for exhausting the cooling fluid from the air gap between teeth of said toothed portion and through means providing for contact of the cooling fluid with only a fractional circumferential part of said rotatable member for any given position thereof.

15. A dynamoelectric machine having a rotatable member forming part of a magnetic circuit and having a relatively smooth outer surface, means including a second member of magnetic material having a toothed portion with slots between adjacent teeth and arranged adjacent said rotor smooth surface with an air gap therebetween for inducing electric currents in said rotatable member, means for supplying cooling fluid substantially radially into said air gap through at least one of said slots in said second member into contact with said rotatable member, and means for exhausting the cooling fluid from the air gap including at least one other of said slots spaced circumferentially on each side of said supply slot in said second member providing for contact of the cooling fluid with only a fractional circumferential part of said rotatable member for any given position thereof.

16. A dynamoelectric machine having a rotatable member with a relatively smooth outer surface adapted to form part of a magnetic circuit, means including a second member having a toothed portion adjacent said rotor smooth surface with an air gap therebetween and arranged to cooperate electromagnetically with said rotatable member for forming a part of said magnetic circuit, means including a field exciting winding for magnetically exciting said machine and for inducing electric currents in said rotatable member, means for supplying cooling fluid into said air gap through at least one of said slots in said second member into contact with said rotatable member, and means for exhausting the cooling fluid from the air gap through means spaced circumferentially from said cooling fluid supply means providing for contact of the cooling fluid with only a fractional circumferential part of said rotatable member for any given position thereof.

17. A dynamoelectric machine having a rotatable member with a relatively smooth outer surface adapted to form part of a magnetic circuit, means including a second member having a toothed portion with slots between the teeth of said toothed portion and arranged adjacent said rotor smooth surface with an air gap therebetween to cooperate electromagnetically with said rotatable member for forming a part of said magnetic circuit and for inducing electric currents in said rotatable member, means including a plurality of spray jet openings through at least one of said teeth for supplying cooling fluid into said air gap into contact with said rotatable member, and means for exhausting the cooling fluid from the air gap through at least one of said slots in the lower portion of said second member spaced circumferentially from said cooling fluid supply means providing for contact of the cooling fluid with only a fractional circumferential part of said rotatable member for any given position thereof.

18. A dynamoelectric machine having a rotatable member with a relatively smooth outer surface adapted to form part of a magnetic circuit, means including a second member having a toothed portion with slots between the teeth of said toothed portion and arranged adjacent said rotor smooth surface with an air gap therebetween to cooperate electromagnetically with said rotatable member for forming a part of said magnetic circuit, means including a field exciting winding for magnetically exciting said machine and for inducing electric currents in said rotatable member, means for supplying cooling fluid into said air gap into contact with said rotatable member, and means for exhausting the cooling fluid from the air gap through at least one of said slots in the lower portion of said second member spaced circumferentially from said cooling fluid supply means providing for contact of the cooling fluid with only a fractional circumferential part of said rotatable member for any given position of said rotatable member.

19. A dynamoelectric machine of the eddy current inductor type having a rotatable member with a relatively smooth outer surface adapted to form part of a magnetic circuit, means including a stationary member having a toothed portion adjacent said rotor smooth surface with an air gap therebetween and arranged to cooperate electromagnetically with said rotatable member for forming a part of said magnetic circuit therewith and for inducing electric currents in said rotatable member, means for supplying cooling fluid into said air gap through radial supply means into contact with said rotatable member, and means for exhausting the cooling fluid from the air gap between teeth of said toothed portion and through radial exhaust means spaced circumferentially from said cooling fluid supply means providing for contact of the cooling fluid with only a fractional circumferential part of said rotatable member for any given position thereof and without substantial axial flow of the cooling fluid.

20. A dynamoelectric machine having a rotatable member with a relatively smooth outer surface adapted to form part of a magnetic circuit, means including a second member having a toothed portion with slots between the teeth of said toothed portion and arranged adjacent said rotor smooth surface with an air gap therebetween to cooperate electromagnetically with said rotatable member for forming a part of said magnetic circuit, means including a field exciting winding for magnetically exciting said machine and for inducing electric currents in said rotatable member, means including a plurality of spray jet openings through at least one of said teeth for supplying cooling fluid into said air gap into contact with said rotatable member, and means for exhausting the cooling fluid from the air gap through at least one of said slots in said second member spaced circumferentially from said cooling fluid supply means providing for contact of the cooling fluid with only a fractional circumferential part of said rotatable member for any given position thereof.

21. A dynamoelectric machine having a rotatable member with a relatively smooth outer surface, means including a second member having a toothed portion wtih slots between the teeth adjacent said smooth surface with an air gap therebetween for inducing electric currents in said rotatable member, means in said second member for supplying cooling fluid into said air gap into contact with said rotatable member, and means including a scoop in at least one of said slots for exhausting the cooling fluid from the air gap through at least one slot spaced circumferentially from said cooling fluid supply means.

22. A dynamoelectric machine having a rotatable member with a core of magnetic material having a relatively smooth outer surface, means including a second member having a core of magnetic material with a toothed portion with slots between the teeth in the magnetic material adjacent said smooth surface with an air gap therebetween for inducing electric currents in said rotatable member, means for supplying cooling fluid into said air gap into contact with said rotatable member, and scoop means for exhausting cooling fluid from the air gap through at least one slot spaced circumferentially from said cooling fluid supply means.

23. A dynamoelectric machine having a rotatable member with a relatively smooth outer surface, means including a second member having a toothed portion with slots between the teeth adjacent said smooth surface with an air gap therebetween for inducing electric currents in said rotatable member, means for supplying cooling fluid into said air gap into contact with said rotatable member, and means including a scoop in at least one of said slots arranged on one of said teeth for exhausting the cooling fluid from the air gap through at least one slot spaced circumferentially from said cooling fluid supply means.

24. A dynamoelectric machine having a rotatable member with a relatively smooth outer surface, means including a second member having a toothed portion with slots between the teeth adjacent said smooth surface with an air gap therebetween for inducing electric currents in said rotatable member, means for supplying cooling fluid into said air gap into contact with said rotatable member, and means including a scoop in at least one of said slots on the side of said slot away from said cooling fluid supply means for exhausting the cooling fluid from the air gap through at least one slot spaced circumferentially from said cooling fluid supply means.

25. A dynamoelectric machine having a rotatable member with a relatively smooth outer surface, means including a second member having a toothed portion with slots between the teeth adjacent said smooth surface with an air gap therebetween for inducing electric currents in said rotatable member, means for supplying cooling fluid into said air gap into contact with said rotatable member, and means including a scoop in at least one of said slots on each side of said cooling fluid supply means for exhausting the cooling fluid from the air gap through at least one slot spaced circumferentially from said cooling fluid supply means.

26. A dynamoelectric machine having a rotatable member with a relatively smooth outer surface, means including a second member having a toothed portion with slots between the teeth adjacent said smooth surface with an air gap therebetween for inducing electric currents in said rotatable member, means for supplying cooling fluid into said air gap into contact with said rotatable member, and means including a scoop in at least one of said slots on each side of said cooling fluid supply means and extending into said air gap for exhausting the cooling fluid from the air gap through at least one slot spaced circumferentially from said cooling fluid supply means.

ROLAND F. HERTEL.